United States Patent [19]

Hatch

[11] 4,144,466
[45] Mar. 13, 1979

[54] DAMPING VIBRATIONS IN VOICE COIL ACTUATOR

[75] Inventor: Michael R. Hatch, San Jose, Calif.

[73] Assignee: International Business Machines Corporation, Armonk, N.Y.

[21] Appl. No.: 838,345

[22] Filed: Sep. 30, 1977

[51] Int. Cl.² .................................... H02K 41/02
[52] U.S. Cl. ..................................... 310/13; 310/27; 179/115.5 VC
[58] Field of Search ................ 310/13, 17, 75, 27; 179/115.5 VC

[56] References Cited

U.S. PATENT DOCUMENTS

| B 351,598 | 1/1975 | Miller et al. | 310/13 X |
|---|---|---|---|
| 2,645,728 | 7/1953 | Willson et al. | 310/27 |
| 2,705,761 | 4/1955 | Unholtz | 310/27 |
| 2,734,138 | 2/1956 | Oravec | 310/27 |
| 2,751,512 | 6/1956 | Reen et al. | 310/27 |
| 2,810,842 | 10/1957 | Lewis | 310/27 |
| 2,945,968 | 7/1960 | McCloskey et al. | 310/27 |
| 3,160,716 | 12/1964 | Luth | 179/115.5 VC |
| 3,194,992 | 7/1965 | Brown | 310/27 |
| 3,484,628 | 12/1969 | Barna | 310/13 |
| 4,035,975 | 10/1977 | Olbrich et al. | 310/13 X |

OTHER PUBLICATIONS

*Machine Design*, Black, 1955, pp. 372–375.
*IBM Tech. Disclosure Bulletin*, vol. 6, No. 6, 11/73 p. 1816.

*Primary Examiner*—Donovan F. Duggan
*Attorney, Agent, or Firm*—Henry E. Otto, Jr.

[57] ABSTRACT

An actuator for a disk file comprises a carriage/arm assembly secured to a coil and movable longitudinally upon energization of said coil. To minimize the amplitude of longitudinal resonance vibration in the actuator upon energization of the coil, the coil is secured to the outer of two concentric overlapping members and the carriage is secured to the inner member. Elastomeric material is disposed radially between and adhered to said concentric members to act as a combination damping means and primary stiffening means for transmitting the major proportion of shear force between said members, and hence, between said coil and carriage. Because stiffness of the elastomeric material varies significantly over the temperature range over which the disk file operates, auxiliary stiffening means is desirably included, preferably in the from of beams which act as springs restraining longitudinal motion between the outer member (and hence the coil) and the carriage. These beams are formed by providing a series of arcuate slots equally spaced circumferentially adjacent that end of the outer member remote from the coil. Each beam is thus defined by that arcuate segment of the outer ring which is between said remote end and the slot. The remaining portion of the shear force is transmitted via the beams which are nested in notches in the carriage.

9 Claims, 2 Drawing Figures

DAMPING VIBRATIONS IN VOICE COIL ACTUATOR

BACKGROUND OF THE INVENTION

This invention relates to electromagnetically controlled apparatus, such as actuator for accessing a disk file, and relates more particularly to such an apparatus in which damping means are provided for attenuating longitudinal resonances excited in the actuator as it is moved longitudinally by and upon energization of coil of a voice coil motor.

To access disk files, transducers are mounted in aligned spaced relation on a series of parallel arms that are cantilever connected at their respective one ends to a plate secured to a carriage. The carriage/arm assembly is movable longitudinally in response to energization of a coil in a voice coil motor. When the coil was connected directly to the carriage, it was found that there was very little damping in the system, with the result that longitudinal resonances and vibrations exceeded the permissible amplitude limits of the particular servo system used with it. This was especially true in an actuator configuration such as shown herein, which has a minimum of bolted connections which contribute to damping out resonances.

Attempts were made to attenuate this longitudinal resonance by applying many different damping materials to the coil and carriage as constrained and unconstrained damping layers. However, none of these attempts were successful. Since the carriage was significantly stiffer than any of the damping materials applied to the surface of the carriage, it was found that even materials having very high damping characteristics did not significantly improve the effective damping of the longitudinal resonance.

The most pertinent prior art known to applicant will now be described. In the IBM Technical Disclosure Bulletin Vol. 16, No. 6, November 1973, at page 1816, there is disclosed a voice coil/bobbin assembly having a layer of damping material disposed radially between the coil and a reduced diameter portion of an adaptor of a voice coil motor. This damping layer is effective to damp hoop modes of vibration. However, since the end of the coil abuts a shoulder on the adaptor, longitudinal force is not transmitted in shear through the damping layer; and hence, it is not effective to damp longitudinal vibrations or resonances in the coil/adaptor assembly resulting from energization of the coil. Moreover, the damping layer would be subject to extreme temperature change and deterioration since it is in direct contact with the coil.

U.S. Pat. No. 3,194,992 shows a vibration generator in which a cylindrical coil-supporting core overlies and is epoxied to a reduced diameter portion of a table member that is movable longitudinally upon energization of the coil. All of the driving forces between the coil and table member are transmitted in shear; however, since the coil-supporting core is rigidly attached to the table member, and the coil is epoxied to the core, the connection is rigid and there is no damping of the longitudinal resonance in the coil-table member assembly resultant from energization of the coil. The connection is rendered even more rigid by use of a reinforcing band about the overlying portion of the core, and repeated reference to need for an epoxy or adhesive having high shear strength.

In "Machine Design" by Paul H. Black, published 1955 by McGraw-Hill Book Company, Inc., there is shown in FIG. 24–12 (at p. 374) two concentric tubes separated by a rubber damping layer. However, this reference does not suggest incorporation of damping material between two concentric sections of a longitudinally movable actuator. Moreover, the reference implies that one of the tubes is mounted rigidly to a fixed support.

The prior art of which applicant is aware thus does not suggest use of an auxiliary stiffening means disposed in parallel with an elastomeric material that serves as a damping means and primary stiffening means for transmitting shear forces.

SUMMARY OF THE INVENTION

The principal object of this invention is to provide an improved electromagnetically controlled actuator for accessing a disk file or the like.

Another object is to provide an electromagnetically controlled apparatus having means for efficiently damping longitudinal vibrations between a coil and an assembly which is connected thereto for movement longitudinally responsively to energization of the coil.

Toward this end and according to the invention, the electromagnetically controlled actuator comprises two concentric rings that are secured to each other radially by an elastomeric material for transmitting shear forces between a coil and a carriage (or other element) that is moved longitudinally upon energization of said coil. The coil and carriage are secured to different ones of said rings, respectively.

The elastomeric material is thus used as a combination damping means and primary stiffening means, constituting a significant structural member in shear between the coil and carriage. A series of springs, in the form of beams, preferably are created by slotting the outer ring of the two concentric overlapping rings. These springs serve as auxiliary stiffening means, limiting the natural frequency changes arising from temperature variations of the elastomeric material; and they also desirably prevent any creep of the elastomeric material that would change the relative position of the coil and carriage.

The foregoing and other objects, features, and advantages of the invention will become apparent from the following more particular description of a preferred embodiment thereof, as illustrated in the accompanying drawings.

DESCRIPTION OF PREFERRED EMBODIMENTS

Figure 1:
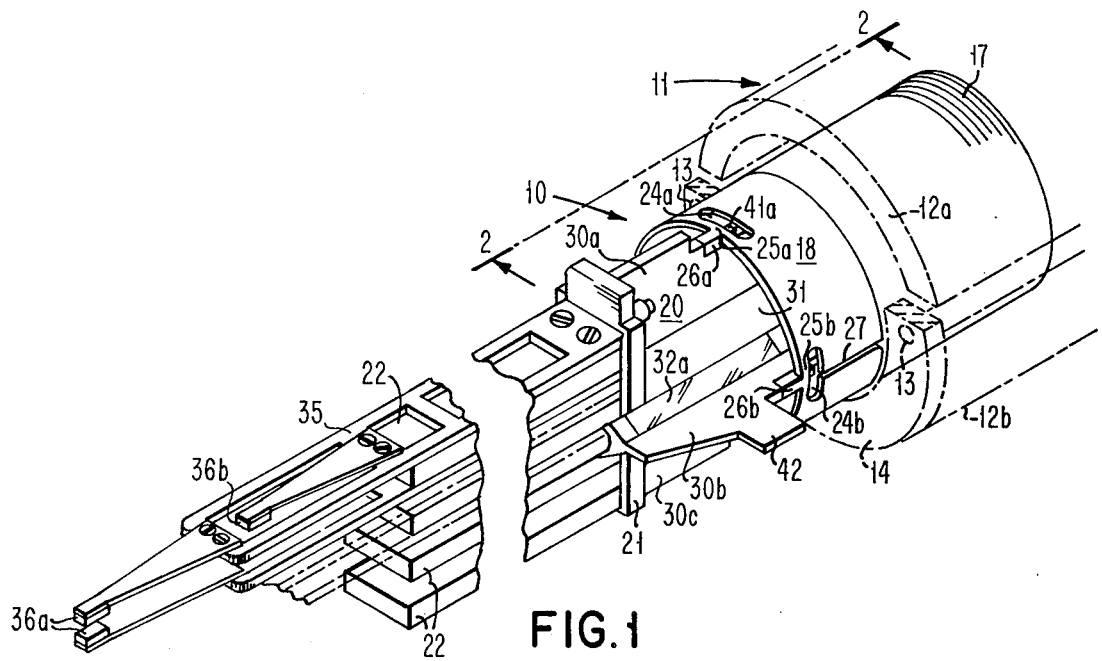
FIG. 1 is a perspective view of an electromagnetically controlled actuator embodying the invention.
Figure 2:
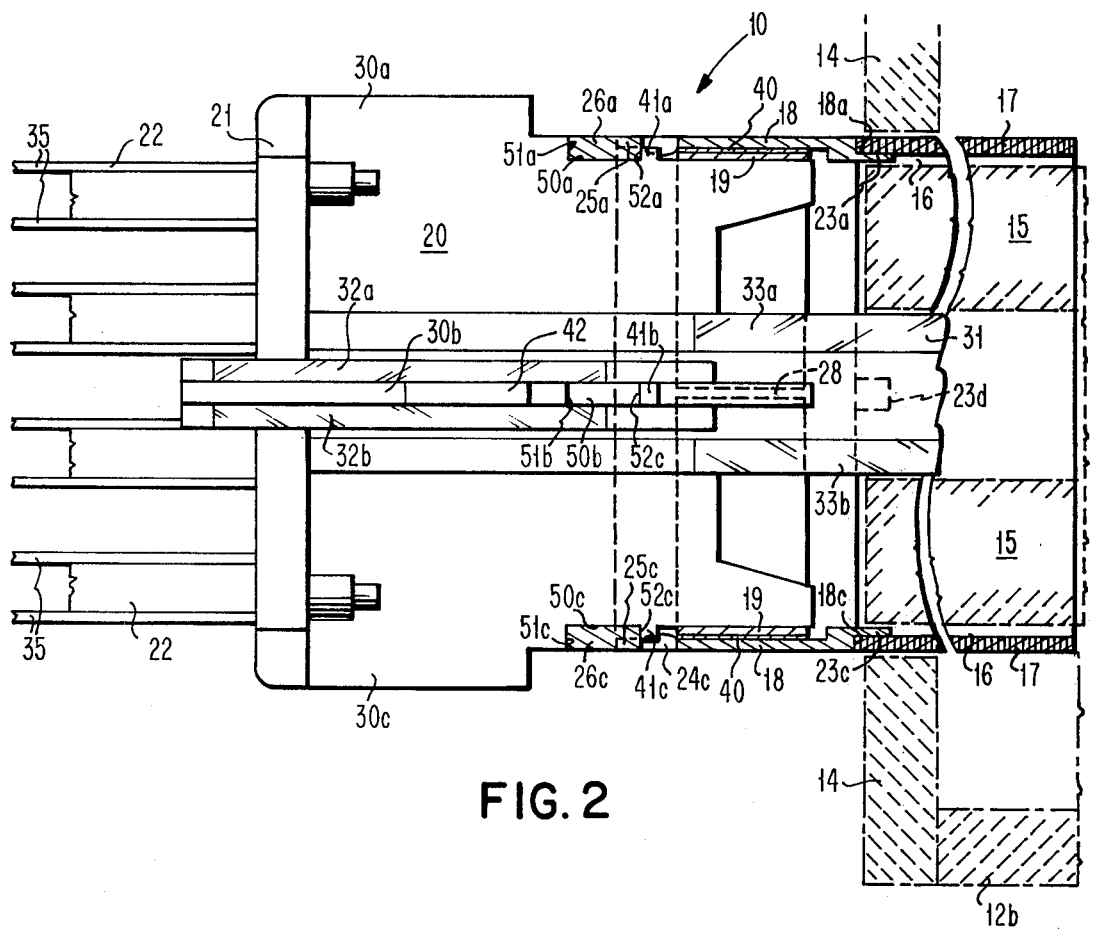
FIG. 2 is a fragmentary vertical sectional view, to enlarged scale, taken along the line 2—2 of FIG. 1.

As illustrated in FIGS. 1 and 2, the actuator 10 embodying the invention is shown associated with a voice coil motor 11 for accessing a disk file (not shown). Voice coil motor 11 comprises a pair of electromagnets 12a,b secured, as by screws 13, in circumferentially spaced relation to a front pole piece 14 and a central pole piece 15 formed integrally with a circular rear plate (not shown). Pole pieces 14, 15 are radially separated by an annular air gap 16.

Actuator 10 comprises an electrically conductive coil 17, a pair of overlapping concentric members or rings 18, 19, and also a carriage 20, plate 21, and arm array 22, hereinafter referred to as carriage/arm assembly, 20, 21, 22. Coil 17 is preferably of the bobbinless type. Axial movement of coil 17 and carriage/arm assembly 20, 21, 22 is initiated in conventional fashion by passing current through the coil. Coil 17 is suitably rigidly secured, as by epoxy, to circumferentially spaced axial projections 23a-d on outer ring 18; and the end of coil 17 abuts and is epoxied to a radial face 18a on outer ring 18. Ring 18 has a plurality of circumferentially spaced slots 24a-d of equal arcuate length to provide a series of springs, in the form of beams 25a-d, between each slot 24 and the end of ring 18 remote from coil 17. Ring 18 also has circumferentially spaced axial projections 26a-d which, as illustrated, are longitudinally aligned with projections 23a-d. Each projection 26 is located at the circumferential midpoint of the corresponding beam 25. Rings 18, 19 have longitudinal slits 27, 28, respectively, to eliminate eddy currents which arise as a result of their proximity to the air gap 16; these slits preferably are disposed diametrically opposite each other so that the weak points they create are not coincident.

Carriage 20 comprises a plurality of fin-like portions 30a-d that project radially from and preferably are formed integrally with a hollow central core 31. Core 31 extends with radial clearance into a central bore in pole piece 15. Carriage 20 has machined surfaces, such as 32a-d and 33a-d, engageable by suitable means (not shown) carried by a fixed support means (not shown). This fixed support means serves to maintain actuator 10 in perfect coaxial and rotary alignment with the voice coil motor and maintain coil 17 in true concentric relation with central pole piece 15. Details of this fixed support means are not deemed necessary for an understanding of the present invention; and hence, to condense the specification, it will not be described.

Plate 21 is secured, as by screws, to the end of carriage 20 remote from coil 17. Plate 21 is flat and extends in a direction transverse of the axis of actuator 10 and voice coil motor 11.

Arm array 22 comprises a plurality of vertically spaced arms 35 each cantilever conneced to plate 21. Each arm carries transducers, such as read-write heads, preferably arranged in longitudinally spaced pairs 36a,b to reduce access time to a selected track of a disk file (not shown) when coil 17 is energized for shifting the actuator longitudially.

According to important features of the invention, coil 17 is secured to outer ring 18, as already noted, and inner ring 19 is suitably rigidly secured, as by epoxy, to the fin-like portions 30a-d of carriage 20. In addition, elastomeric material 40 is disposed radially between the overlapping circumferential surfaces of rings 18, 19. This elastomeric material, preferably is of a type having inherent adhesive characteristics; but it may, if desired, be bonded to the rings. The elastomeric material is most easily applied as a self-contained ribbon-like layer to the inner surface of outer ring 18. The split inner ring 19 is then compressed, inserted within outer ring 18 and then permitted to expand and adhere to the elastomeric material 40, assuming the position in which it is shown in the drawings.

It should be noted that inner ring 19 does not block the slots 24 in outer ring 18. Fin portions 30a,c are identical but configured slightly differently than the identical fin portions 30b,d, in that the latter are longer, and each provides a pair of the machined surfaces 32. Fin portions 30b,d are also of slightly larger outer diameter to provide respective crash stops 42 that are adapted to contact a stop surface (not shown) in the aforementioned fixed support means to limit the extent of axial movement of the actuator 10; however, this is not pertinent to the present invention.

The rings 18, 19 and elastomeric material 40 at this stage constitute a "ring assembly" 18, 19, 40, which is ready for mounting on carriage/arm assembly 20-22. Rectangular notches 50a-d are defined between spaced radial shoulders 51a-d, 52a-d on fin portions 30a-d, respectively, of carriage 20, shoulders 52a-d being defined by one end of the respective projections 41a-d. The surfaces of each notch 50 are coated with epoxy; whereupon the ring assembly 18, 19, 40 is slipped axially over the fin portions 30, then rotated to insert and confine the outer ring's axial projections 26 within the respective notches 50. Coil 17 can now be secured to outer ring 18 in the manner heretofore described; or, it preferred, it could have been secured prior to mounting of the ring assembly on the carriage.

In either event, when actuator 10 is caused to move axially with respect to the stationary voice coil motor 11 in response to energization of coil 17, resultant longitudinal resonances and vibrations in the actuator will be effectively damped in the following manner.

The major portion of the shear forces between coil 17 and carriage/arm assembly 20-22 will be transmitted through the rings 18, 19 and elastomeric material 40, thus significantly damping the longitudinal resonances and vibrations. The remainder of the shear forces will be transmitted between coil 17 and carriage/arm assembly 20-22 in parallel with the elastomeric material 40 as a result of the interlocking engagement of the outer ring's axial projections 26 with the shoulders 51, 52 in carriage 20. It is to be noted that normally only a minor part of the shear force is thus transmitted through the spring beams 25 because said beams are narrow in width and hence relatively weak in shear. The width of beams 25 and the length of slots 24 are so selected as to provide a desired proportionality of shear force transmission through the elastomeric material 40 and, in bypass thereof, through the beams 25.

It should be noted that the elastomeric material 40 thus serves as a combination damping means and primary stiffening means for transmitting the major part of the shear forces between the coil and carriage; whereas the beams 25 act as auxiliary stiffening means normally of lesser stiffness than the elastomeric material for transmitting the remaining part of the shear forces.

Employment of these spring beams as auxiliary stiffening means is highly desirable because the stiffness of the elastomeric material will undesirably decrease a significant degree during worst case conditions of disk file operations; e.g., when ambient temperature is high and high temperatures are generated in the voice coil motor. Without these spring beams 25, the natural frequency of actuator 10 could change excessively and undesirably due to the large temperature variations. However, since the stiffness of beams 25 does not vary with temperature, the beams desirably limit the decrease in natural frequency of actuator 10 while nevertheless permitting elastomeric material 40 to provide significant stiffness in the system and significantly contribute to the overall damping. In addition, the interlocking engagement of the beams 25 with carriage 20 prevents material 40 from creeping and undesirably changing the axial position of the carriage relative to the coil.

It should be understood that while this configuration of actuator is especially desirable to provide finely controlled movement of a carriage/arm assembly relative to the closely spaced tracks on a disk file, it may also be used in other applications requiring effective damping and accurate longitudinal positioning of an actuator.

While the invention has been particularly shown and described with reference to a preferred embodiment thereof, it will be understood by those skilled in the art that various changes in form and detail may be made therein without departing from the spirit, scope and teaching of the invention. Accordingly, the apparatus herein disclosed is to be considered merely as illustrative, and the invention is to be limited only as specific in the claims.

What is claimed is:

1. An electromagnetically controlled longitudinally movable actuator comprising:
   a pair of concentric members at least partially overlapping each other;
   an electrically conductive coil secured to one of said members;
   an assembly secured to the other of said members;
   stiffening means comprising damping material disposed radially between and adhered to the overlapping surfaces of said members for transmitting a part of the forces in shear between said coil and said assembly during longitudinal movement of the actuator responsively to energization of said coil, said damping material also serving to damp longitudinal resonances excited by energization of said coil; and
   auxiliary stiffening means connecting said coil and assembly in parallel with said damping material, said auxiliary stiffening means being of different stiffness than the damping material disposed between said members to transmit the remaining part of such shear force and limit natural frequency change in the actuator arising from variations in temperature of said damping material.

2. An actuator according to claim 1, characterized in that said auxiliary stiffening means comprises springs.

3. An actuator according to claim 1, characterized in that said auxiliary stiffening means comprises springs in the form of beams longitudinally adjacent a plurality of circumferentially extending slots in said one member, said beams being rigidly secured to said assembly.

4. An actuator according to claim 1, wherein said assembly comprises a plurality of radially projecting fin-like portions equally spaced circumferentially about a central core, said other member being adhered to said radially projecting portions.

5. An actuator according to claim 1, wherein said assembly is a carrier/arm assembly for accessing a disk file, and said coil interacts with a voice coil motor.

6. An actuator according to claim 1, wherein said assembly comprises a plurality of equally circumferentially spaced, radially projecting portions, the inner surface of said other member being adhered to said projecting portions, and said auxiliary stiffening means is defined by segments of said one member disposed between circumferential slots and the end of said one member remote from said coil, each side of each beam substantially at its midpoint having effective abutting contact with axially spaced surfaces on a respective one of said projecting portions.

7. An electromagnetically controlled axially movable actuator comprising, in combination:
   an electrically conductive coil;
   an assembly operatively connected to said coil and movable axially in response to energization of said coil; and
   means for damping longitudinal vibrations between said coil and assembly resultant from energization of said coil, said means including
   (a) two members arranged coaxially with, and secured respectively to, said coil and assembly, and
   (b) primary stiffening means comprising elastomeric material adhered to overlapping surfaces of said two members for transmitting a portion of the forces in shear between said coil and assembly, which portion varies according to changes in a preselected ambient conditions, and
   (c) auxiliary stiffening means for transmitting substantially all the remaining portion of such shear forces between said coil and assembly in bypass of said elastomeric material, said remaining portion being substantially unaffected by changes in said ambient condition.

8. An actuator, according to claim 7, wherein said means (c) comprises spring elements having a stiffness less than that of the elastomeric material and connecting the coil-connected one of said members additionally to said assembly.

9. An actuator according to claim 8, wherein said spring elements are defined by longitudinally weakened portions of said coil-connected member formed by arcuate circumferential slots in said coil-connected member, and said spring elements are nested in notches in said assembly to effect interlocking engagement therewith.

* * * * *